United States Patent
Bicais et al.

(10) Patent No.: US 11,463,289 B2
(45) Date of Patent: Oct. 4, 2022

(54) MACHINE LEARNING-BASED DEMODULATION METHOD FOR ENERGY-DETECTING MIMO RECEIVERS

(71) Applicant: COMMISSARIAT A L'ENERGIE ATOMIQUE ET AUX ENERGIES ALTERNATIVES, Paris (FR)

(72) Inventors: Simon Bicais, Grenoble (FR); Alexis Falempin, Grenoble (FR); Jean-Baptiste Dore, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/331,586

(22) Filed: May 26, 2021

(65) Prior Publication Data
US 2021/0377083 A1    Dec. 2, 2021

(30) Foreign Application Priority Data
May 29, 2020  (FR) ...................... 2005670

(51) Int. Cl.
*H04L 27/06* (2006.01)
*H04B 7/08* (2006.01)

(52) U.S. Cl.
CPC ............... *H04L 27/06* (2013.01); *H04B 7/08* (2013.01)

(58) Field of Classification Search
CPC ......... H04B 7/0413; H04B 7/08; H04L 27/06; G06N 3/02
See application file for complete search history.

(56) References Cited

U.S. PATENT DOCUMENTS

| 5,048,053 A | * | 9/1991 | Mower | H04B 1/708 375/149 |
|---|---|---|---|---|
| 2007/0162819 A1 | * | 7/2007 | Kawamoto | H04L 1/0043 714/758 |
| 2010/0316151 A1 | * | 12/2010 | Fukawa | H04L 25/03171 375/260 |
| 2013/0301758 A1 | * | 11/2013 | Reial | H04L 1/0051 375/340 |
| 2017/0134050 A1 | * | 5/2017 | Abu-Surra | H04L 1/0045 |
| 2018/0367192 A1 | | 12/2018 | O'Shea et al. | |
| 2019/0081824 A1 | * | 3/2019 | Arvinte | H03M 13/2957 |
| 2020/0059306 A1 | * | 2/2020 | Baek | H04B 7/0473 |

(Continued)

OTHER PUBLICATIONS

Hwang, et al., "Spectrum sensing using multiple antenna-aided energy detectors for cognitive radio", 2009 Canadian Conference on Electrical and Computer Engineering, pp. 209-212, 2009.

(Continued)

*Primary Examiner* — David B Lugo
(74) *Attorney, Agent, or Firm* — BakerHostetler

(57) ABSTRACT

A method for receiving a plurality of separate signals transmitted respectively by a plurality of transmit antennas, includes the steps of: receiving a plurality of respective signals on a plurality of receive antennas, applying energy detection to each of the received signals, jointly demodulating the received signals by way of a machine-learning algorithm trained beforehand so as to learn to demodulate each modulated symbol of the transmitted signal based on the respective contributions of this modulated symbol that are received on the plurality of receive antennas.

15 Claims, 8 Drawing Sheets

(56) References Cited

U.S. PATENT DOCUMENTS

2021/0351820 A1* 11/2021 Huang ................ H04B 7/0413

OTHER PUBLICATIONS

Soltani, et al., "A novel and low complex detection method for MIMO channels: A new perspective", 2012 Sixth International Symposium on Telecommunications (IST), 2012.

Psaltopoulos, et al., "Diversity and spatial multiplexing of MIMO amplitude detection receivers", 2009 IEEE 20th International Symposium on Personal, Indoor and Mobile Radio Communications, Sep. 2009.

Farsad, et al., "Neural network detection of data sequences in communication systems", IEEE Transactions on Signal Processing, 2018.

Elrharras, et al., "Hybrid architecture for spectrum sensing algorithm based on energy detection technique and artificial neural networks", 2014 5th Workshop on Codes, Cryptography and Communication Systems (WCCCS), 2014.

Samuel, et al., "Deep MIMO Detection", 2017 IEEE 18th International Workshop on signal processing advances in wireless communications, 2017.

* cited by examiner

MACHINE LEARNING-BASED DEMODULATION METHOD FOR ENERGY-DETECTING MIMO RECEIVERS

CROSS-REFERENCE TO RELATED APPLICATIONS

This application claims priority to foreign French patent application No. FR 2005670, filed on May 29, 2020, the disclosure of which is incorporated by reference in its entirety.

FIELD OF THE INVENTION

The invention relates to the field of MIMO (multiple-input multiple-output) communication systems, that is to say for which the transmitter and the receiver each comprise a plurality of antennas and therefore a plurality of transmission/reception paths.

The invention relates more generally to high-speed wireless communication systems operating on high frequency bands, in particular frequencies in what is called the millimetre spectrum of the order of 60 to 300 GHz.

BACKGROUND

The applications targeted in this domain relate notably to high-speed links between an access point and a core network or high-speed short-distance communications.

A first known solution for increasing the data rate of a wireless communication system consists in performing frequency multiplexing in order to implement simultaneous transmission on different frequencies. This solution makes it possible to increase the transmission data rate by a factor equal to the number of frequency channels, but it exhibits numerous drawbacks. It firstly requires having a wide available frequency band. It also involves implementing filter banks at transmission and at reception, which may introduce losses when the signals are channelled, but also inter-channel interference. This type of solution furthermore more often than not requires a coherent reception architecture that is highly sensitive to phase noise. Specifically, the frequency oscillators associated with each channel operate at a high frequency. Degradations caused by phase noise mean that it is necessary to implement a suitable demodulation algorithm that is more complex in order to correct these imperfections.

Another solution consists in performing spatial multiplexing using a plurality of antennas at transmission and a plurality of antennas at reception. This type of system is known by the acronym MIMO (multiple-input multiple-output). It has the advantage of making it possible to increase the data rate by a factor equal to the number of antennas at transmission, but encounters problems in terms of spatial interference between the signals transmitted by the various antennas.

Document [1] presents an MIMO transmission system for which the receiver implements an amplitude detector for detecting the amplitude of the received signals.

Implementing amplitude detection (or energy detection) at reception introduces nonlinearities into the transmission chain. The demodulation algorithm proposed in [1] is based on a maximum likelihood criterion that requires a precise estimate of the parameters of the channel, that is to say of the global transfer function of the transmission chain including the model of the propagation channel, the spatial interference between signals received by various antennas and nonlinearities caused by the envelope detection at reception.

Document [2] proposes prior art for using machine-learning algorithms, based on neural networks, in order to create a demodulator. The solutions proposed in [2] are limited to single-path systems, that is to say comprising only one antenna at transmission and at reception.

Document [3] proposes another application for using neural networks in order to perform spectrum detection, that is to say detection of the occupancy of various frequency bands of a spectrum of given width.

Document [4] proposes a demodulator based on a neural network for a MIMO communication system. However, the solution proposed in that document considers a linear model, that is to say a linear relationship between the symbols received at the input of the demodulator and the transmitted symbols. In addition, the proposed architecture is developed taking into consideration the knowledge of the channel and the linear nature of the model. It is therefore necessary to estimate the channel at the receiver in order to use the solution from document [4] in a practical system. The proposed solution is therefore unsuitable for nonlinear systems.

SUMMARY OF THE INVENTION

The present invention proposes a novel type of receiver for MIMO communication systems that implements energy detection and a demodulation algorithm based on machine learning, for example by way of artificial neural networks.

Using neural networks has the advantage of taking into consideration the nonlinearities introduced by the transmission chain and of utilizing spatial interference to detect the symbols transmitted on each transmission path, without having to implement a precise channel estimate.

Moreover, the invention proposes to further improve the performance of the demodulator by associating with it an algebraic error correction code that may be adapted to spatial multiplexing.

One subject of the invention is a method for receiving a plurality of separate signals transmitted respectively by a plurality of transmit antennas, comprising the steps of:

Receiving a plurality of respective signals on a plurality of receive antennas,

Applying energy detection to each of the received signals,

Jointly demodulating the received signals by way of a machine-learning algorithm trained beforehand so as to learn to demodulate each modulated symbol of the transmitted signal based on the respective contributions of this modulated symbol that are received on the plurality of receive antennas.

According to one particular aspect of the invention, the transmitted signals are amplitude-modulated.

According to one particular aspect of the invention, the machine-learning algorithm is implemented by way of at least one artificial neural network receiving the respective signals received on the receive antennas at input and providing an estimate of the transmitted symbols at output.

According to one particular aspect of the invention, a separate artificial neural network is implemented in order to demodulate each signal transmitted by a separate transmit antenna based on all of the respective signals received on the receive antennas.

According to one particular aspect of the invention, at least one artificial neural network is implemented in order to jointly demodulate the signals transmitted by a plurality of transmit antennas.

According to one particular aspect of the invention, the method comprises a preliminary phase of training the machine-learning algorithm on pilot symbols transmitted by the plurality of transmit antennas.

According to one particular aspect of the invention, the machine-learning algorithm is trained so as to minimize an error rate between the demodulated symbols and the transmitted symbols.

According to one particular aspect of the invention, the transmitted signals are protected by way of an error correction code and the method furthermore comprises a step of decoding the demodulated symbols by way of a channel decoder applied to the demodulated symbols on the various series-concatenated reception paths.

According to one particular aspect of the invention, the transmitted signals are protected by way of an error correction code and the method furthermore comprises a step of decoding the demodulated symbols on each reception path in parallel by way of a plurality of respective decoders.

According to one particular aspect of the invention, the correction code is an algebraic code, for example a BCH code.

Another subject of the invention is a multipath receiver comprising a plurality of receive antennas for receiving separate signals transmitted respectively by a plurality of transmit antennas, the receiver comprising one energy detector per reception path and a demodulator configured so as to jointly demodulate the received signals by way of a machine-learning algorithm trained beforehand so as to learn to demodulate a modulated symbol of the transmitted signal based on the respective contributions of this modulated symbol that are received on the plurality of receive antennas.

In one variant embodiment, the receiver according to the invention comprises a number of receive antennas greater than or equal to the number of transmit antennas.

In one variant embodiment, the demodulator comprises a number of outputs equal to the number of transmit antennas.

In one variant embodiment, the receiver according to the invention furthermore comprises a demultiplexer for series-concatenating the demodulated symbols on the various outputs of the demodulator and a channel decoder configured so as to decode the symbols at the output of the demultiplexer.

In one variant embodiment, the receiver according to the invention furthermore comprises a separate channel decoder configured so as to decode the symbols provided on each respective output of the demodulator.

According to one particular aspect of the invention, the coding rate of each channel decoder is configured independently.

BRIEF DESCRIPTION OF THE DRAWINGS

Other features and advantages of the present invention will become more clearly apparent upon reading the following description with reference to the following appended drawings.

DETAILED DESCRIPTION

Figure 1:
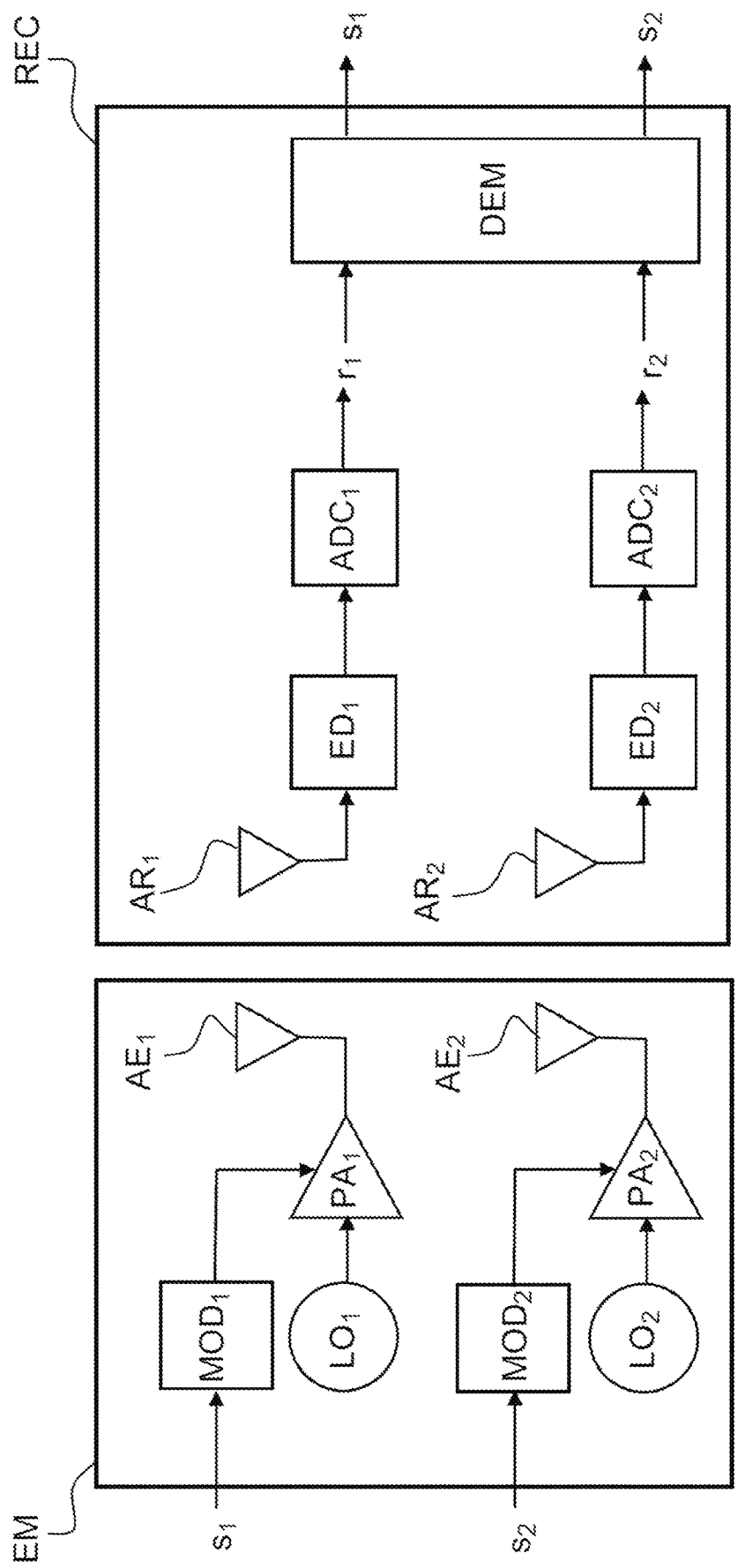
FIG. 1 shows a functional diagram of a transmission system including a receiver according to the invention.

FIG. 1 shows a functional diagram of a multipath transmission system according to the invention. The transmitter EM of the system comprises a plurality of transmission paths each comprising an amplitude modulator $MOD_1$, $MOD_2$, an amplifier $PA_1$, $PA_2$, a frequency oscillator $LO_1$, $LO_2$ and an antenna $AE_1$, $AE_2$. The transmitted signals are modulated via an amplitude modulation, for example pulse position modulation (PPM) or pulse width modulation (PWM) or pulse amplitude modulation (PAM) or on-off keying (OOK) amplitude modulation. The signals Si, 52 transmitted on each transmission path are independent.

The receiver REC also comprises a plurality of reception paths each comprising a receive antenna $AR_1$, $AR_2$, an energy detector or envelope detector $ED_1$, $ED_2$ and an analogue-to-digital converter $ADC_1$, $ADC_2$. The number of reception paths is at least equal to the number of transmission paths, but it may be greater. The signals digitized on each path $r_1$, $r_2$ are provided at the input of a digital demodulator DEM, which jointly demodulates the signals so as to render the symbols $s_1$, $s_2$ transmitted on each transmission path. In other words, the number of outputs of the demodulator DEM is equal to the number of transmission paths.

The digital demodulator DEM may be produced in the form of software and/or hardware, notably using one or more processors and one or more memories. The processor may be a generic processor, a specific processor, an application-specific integrated circuit (ASIC) or a field-programmable gate array (FPGA).

Figure 2:
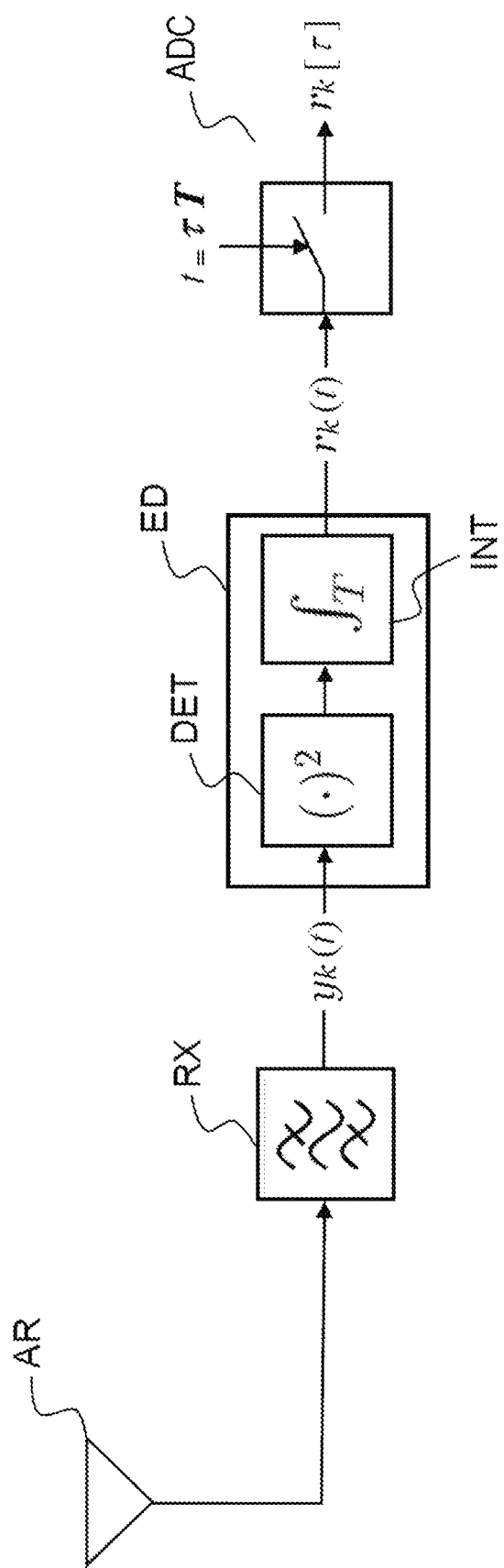
FIG. 2 shows a diagram of an analog reception chain of a path of a receiver according to the invention.

FIG. 2 schematically shows an analogue reception chain of a reception path of the receiver according to the invention.

The signals received by the antenna AR are processed by a radiofrequency conversion chain RX, which comprises one or more filters and/or one or more amplifiers. An energy detector ED is then applied to the signal transposed into baseband. This energy detector ED comprises a quadratic detector DET that performs an analogue function equivalent to squaring the received signal. The quadratic detector DET is formed for example by way of a diode or of an auto-mixer device. The energy detector ED also comprises a time integrator INT. The integration period is preferably equal to a multiple of the period of a symbol $T_s$ of the modulated signal.

The signals $r_k(t)$ obtained at the output of the energy detector ED are then digitized (or sampled) by an analogue-to-digital converter ADC so as to produce digital symbols, which are then provided to the digital demodulator DEM.

Using an energy detector ED has the advantage of limiting the influence of phase noise, but has the drawback of introducing nonlinearities into the processing chain, requiring appropriate demodulation.

Figure 3:
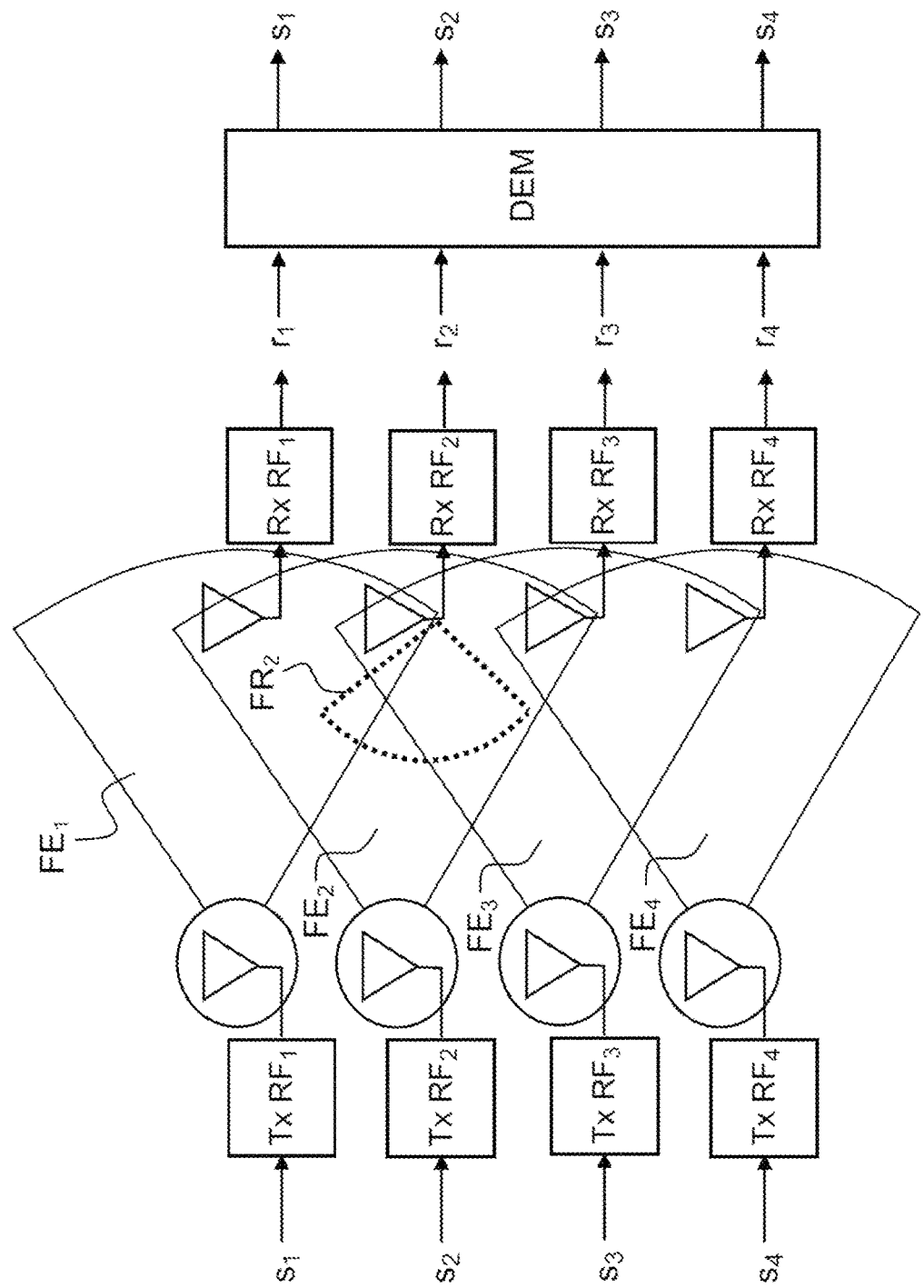
FIG. 3 shows a diagram illustrating the phenomenon of spatial interference in a transmission system according to the invention.

FIG. 3 schematically shows another example of a transmission system according to the invention in which the number of transmission and reception paths is equal to 4. FIG. 3 schematically shows the beams $FE_1$, $FE_2$, $FE_3$, $FE_4$ transmitted respectively by the four transmit antennas. The antennas of the transmitter are preferably directional antennas. However, depending on the distances between the transmitter and the receiver, the distances between the transmit antennas and the distances between the receive antennas, the signal transmitted by a transmit antenna may be received by a plurality of receive antennas.

For example, the receive antenna $AR_2$ potentially receives contributions of signals transmitted respectively by the first three transmit antennas, as shown schematically in FIG. 2 by the beam $FR_2$ received by the second receive antenna.

This type of multipath system thus leads to spatial interference between the propagation channels linking a transmit antenna to a receive antenna.

Spatial interference leads to diversity, that is to say that a symbol is transmitted on a plurality of channels. Spatial interference also leads to ambiguity, that is to say that a plurality of symbols having similar energy levels are received by one and the same receive antenna, thereby creating interference.

One objective of the demodulator DEM is to estimate the transmitted symbols based on the signals received on each path, in spite of the high spatial interference.

In the case of a conventional demodulator applied independently to each reception path, spatial interference is considered and dealt with in the same way as noise, and such a demodulator then has to be configured with an optimum detection threshold that takes this interference into consideration.

Another solution consists in processing all of the reception paths jointly by no longer considering spatial interference in the same way as noise, but rather in the same way as information.

One known joint demodulation solution is based on a maximum likelihood algorithm. This type of algorithm requires having a precise estimate of the transfer function of the propagation channel. It is also based on the assumption that the channel is Gaussian.

Using energy detectors on each reception path renders the Gaussian channel assumption obsolete, since these introduce nonlinearities into the signals provided at the input of the demodulator.

For these reasons, the invention proposes a demodulator based on an artificial neural network-type machine-learning algorithm.

Figure 4:
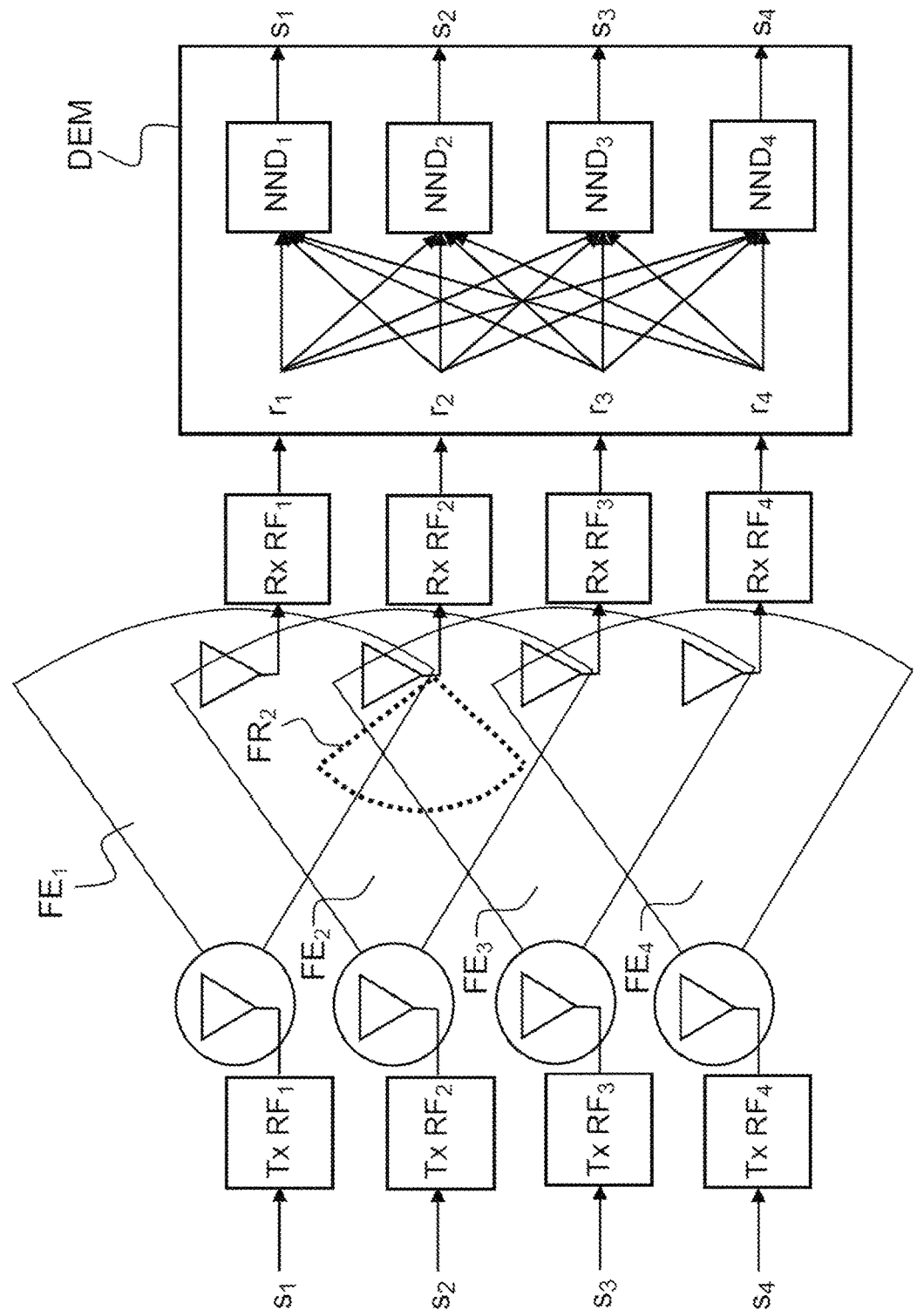
FIG. 4 shows one embodiment of a demodulator according to the invention using a plurality of artificial neural networks.

FIG. 4 schematically shows one embodiment of the demodulator DEM, for which a separate artificial neural network $NND_1$, $NND_2$, $NND_3$, $NND_4$ is used to separately estimate the symbols $s_1$, $s_2$, $s_3$, $s_4$ respectively transmitted on the four transmission paths.

Figure 5:
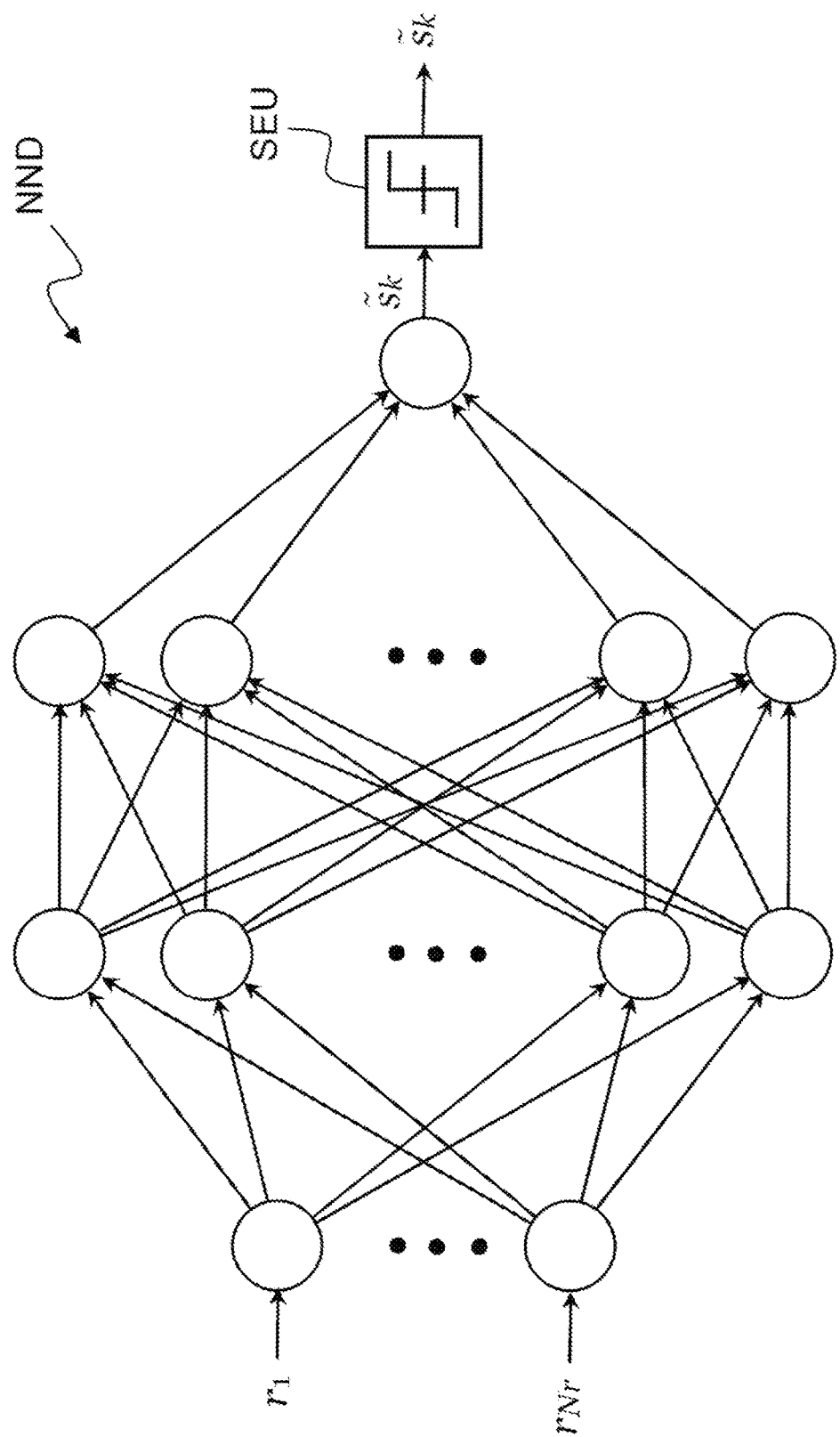
FIG. 5 shows one example of an artificial neural network configured so as to form a demodulator according to the invention.

One example of a neural network NND for demodulating the symbols transmitted on a transmission path is shown in FIG. 5.

The input layer of the neural network NND comprises a number of neurons equal to the number of reception paths so as to simultaneously receive the signals digitized on each path $r_1, \ldots r_{N_r}$. The neural network NND comprises one or more hidden layers, for example two hidden layers in the example of FIG. 5, and an output layer with a single neuron.

The neural network NND is fully connected, that is to say that each neuron of a layer is connected to all of the neurons of the preceding layer and to all of the neurons of the following layer. It forms a multilayer perceptron.

The neurons of the hidden layers implement a specific activation function, for example a linear rectification function or ReLU (rectified linear unit) function.

The neuron of the output layer provides a prediction $\tilde{s}_k$ of each symbol transmitted on a transmission path. This prediction is consistent with a probability of receiving the symbol $s_k$, with knowledge of the vector $r=[r_1, \ldots r_{N_r}]$ of the signals at the input of the network. The symbols estimated by the output layer may be amplitude-modulated symbols or may be binary symbols before modulation. In this second case, the activation function implemented by the neuron of the output layer is for example a sigmoid function. A thresholding step SEU makes it possible to convert the prediction $\tilde{s}_k$ into a binary symbol $\hat{s}_k$.

If the symbols estimated by the output layer are symbols modulated on a number of states other than two, the activation function is adapted accordingly and the thresholding step SEU is replaced with a symbol-to-bit converter suitable for the targeted modulation type. This converter is for example formed using a plurality of different thresholds.

The number of hidden layers is a parameter that depends notably on the number of reception paths. For example, for four receive antennas, the number of hidden layers may be equal to 2. For eight receive antennas, the number of hidden layers may be equal to 4. Generally speaking, the higher the number of receive antennas, the higher as well the number of observations at the input of the neural network, each observation potentially comprising contributions of signals transmitted on a plurality of transmission paths. Increasing the number of hidden layers of the neural network makes it possible to increase the number of parameters, to be optimized, of the network, and therefore to improve the optimization in the presence of spatial interference.

The number of neurons of a hidden layer is likewise configurable.

The neural networks used respectively to demodulate each signal associated with a transmission path are not necessarily identical, and may be configured differently.

Each neural network NND is trained in a preliminary training phase performed by way of pilot symbols.

In other words, this training phase consists in transmitting a sequence of pilot symbols on each transmission path and in training each neural network NND to recognize the transmitted symbols based on all of the observations $r=[r_1, \ldots r_{N_r}]$ received on the antennas of the receiver. The training or learning phase is typically performed by way of a backpropagation algorithm using, at the output of the network, a cost function that seeks to minimize the error between each transmitted symbol and the symbol estimated by the output layer.

When the symbols estimated by the network are binary symbols and the amplitude modulation that is used is on-off keying (OOK) modulation, the cost function that is used is for example a cross-sample entropy binary function defined by the following relationship:

$$J = \frac{1}{M} \sum_{k=1}^{M} \left[ \frac{s_k}{\sqrt{2}} \log(\tilde{s}_k) + \left(1 - \frac{s_k}{\sqrt{2}}\right) \log(1 - \tilde{s}_k) \right]$$

M is the number of pilot symbols, $s_k$ is the transmitted symbol and $\hat{s}_k$ is the symbol estimated by the neural network.

If the estimated symbols are non-binary or the amplitude modulation is other than OOK modulation, the cost function is adapted accordingly, and may be for example a mean squared error function calculated between the transmitted pilot symbols and the estimated symbols.

During learning, the synaptic coefficients of the neural network are optimized by way of an optimization algorithm, for example a gradient descent algorithm or an Adam optimizer.

One variant embodiment of the invention consists in implementing one or more neural networks that are able to jointly estimate a plurality of symbols corresponding to a plurality of transmission paths. For example, it is possible to use a single neural network (rather than one network per transmission path) that comprises an output layer having a number of neurons equal to the number of transmission paths.

In this case, each output neuron aims to estimate the symbols transmitted on a transmission path.

One intermediate solution between the two abovementioned embodiments consists in using a plurality of neural networks, each network being intended to estimate the symbols transmitted by at least two transmission paths and therefore comprising at least two outputs.

One advantage of using a demodulator based on artificial neural networks is that it is capable of taking into consideration nonlinearities introduced notably by the energy detectors and by spatial interference during the learning phase, and without having to separately estimate the transfer function of the propagation channel.

Figure 6:
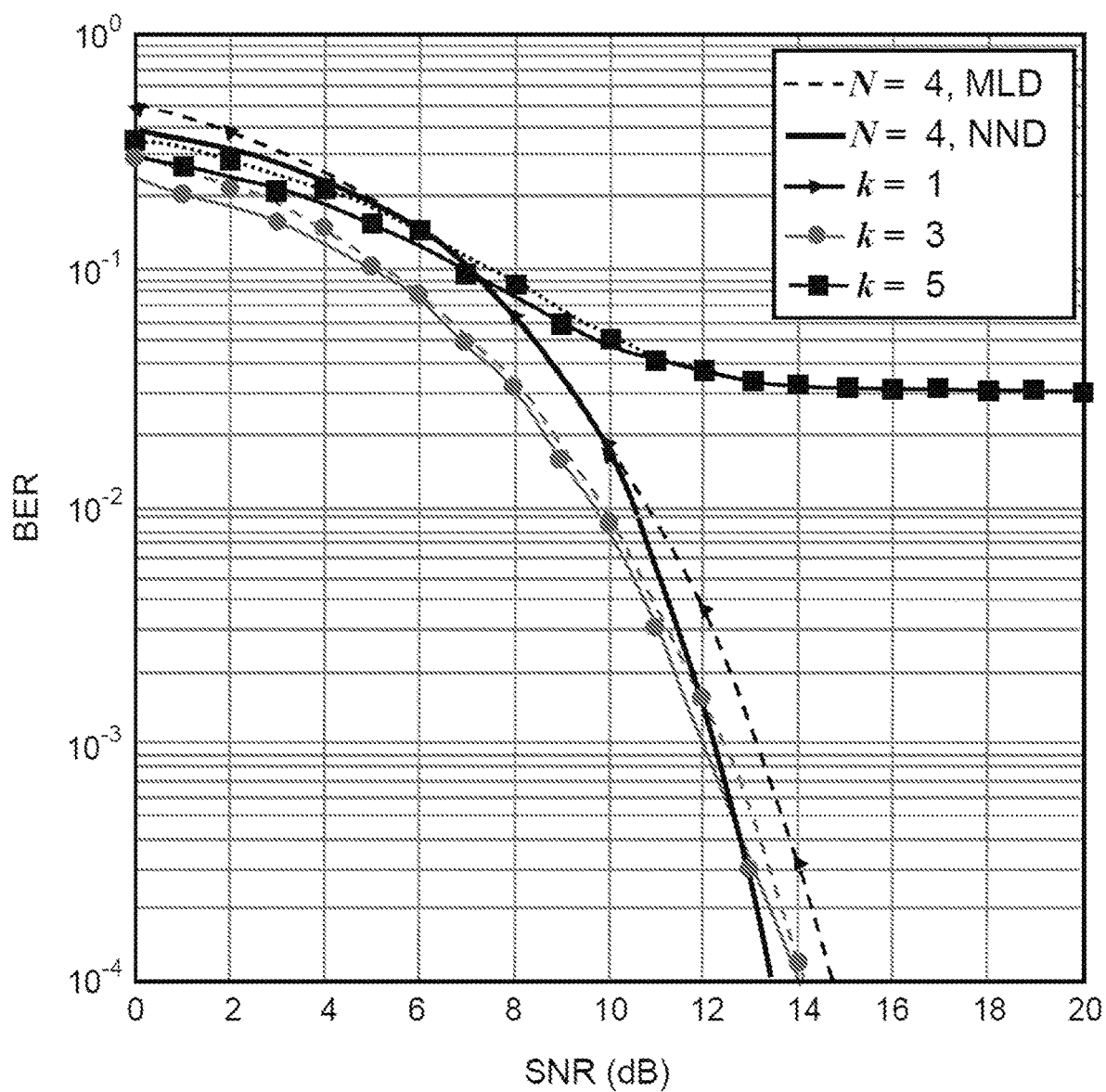
FIG. 6 shows comparative performance results between the invention and a solution from the prior art for a 4-antenna receiver.

FIG. 6 shows a plurality of comparative simulation results for illustrating the contribution of the invention with respect to a demodulator based on a maximum likelihood algorithm (MLD).

The results illustrated in FIG. 6 are bit error rate curves at the demodulation output as a function of a signal-to-noise ratio expressed in dB. They are obtained through simulation for a transmission system comprising 4 antennas at transmission and 4 antennas at reception.

Three spatial interference levels are simulated and, for each interference level, the curve in dashed lines corresponds to a demodulation based on a maximum likelihood algorithm (MLD) and the curve in unbroken lines corresponds to a demodulation based on one or more neural networks (NND).

The interference level is defined by the number K of receive antennas that receive at least a portion of the beam transmitted by a transmit antenna.

In other words, K=1 corresponds to a zero spatial interference level for which each receive antenna receives only the signals transmitted by a corresponding single transmit antenna.

K=3 corresponds to a first non-zero spatial interference level for which each receive antenna receives the signals transmitted by the opposite transmit antenna and at most one transmit antenna close to the opposite antenna, that is to say at most three antennas.

K=5 corresponds to a second non-zero spatial interference level for which each receive antenna receives the signals transmitted by the opposite transmit antenna and at most two transmit antennas close to the opposite antenna, that is to say at most five antennas.

In the absence of any spatial interference (K=1), the results obtained with a demodulator according to the invention exhibit a performance gain both with a low signal-to-noise ratio and with a high signal-to-noise ratio. This is due to the fact that the neural network-based algorithm takes into consideration nonlinearities caused by the introduction of energy detectors, unlike the maximum likelihood algorithm, which operates with a Gaussian propagation channel assumption.

In the presence of spatial interference (K=3 or 5), the results are close between the two methods.

Figure 7:
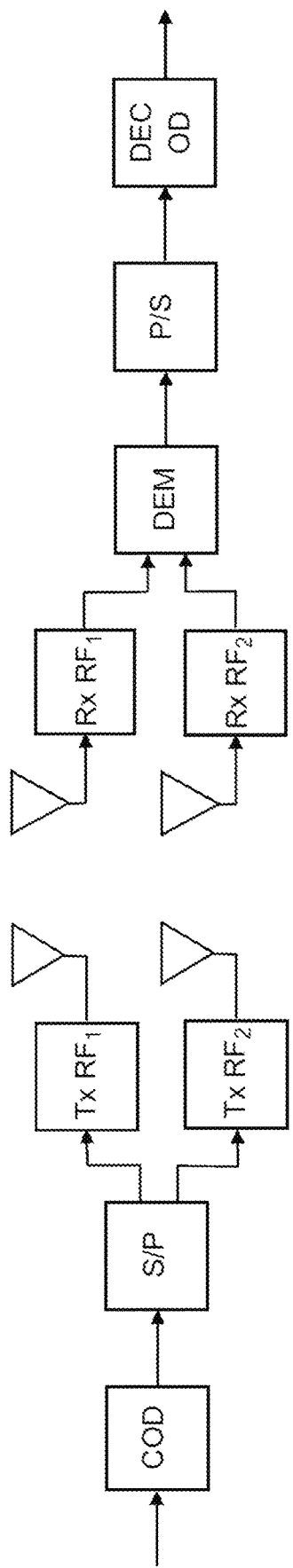
FIG. 7 shows a first variant embodiment of a transmission system according to the invention using a correction code that is common to all of the reception paths.
Figure 8:
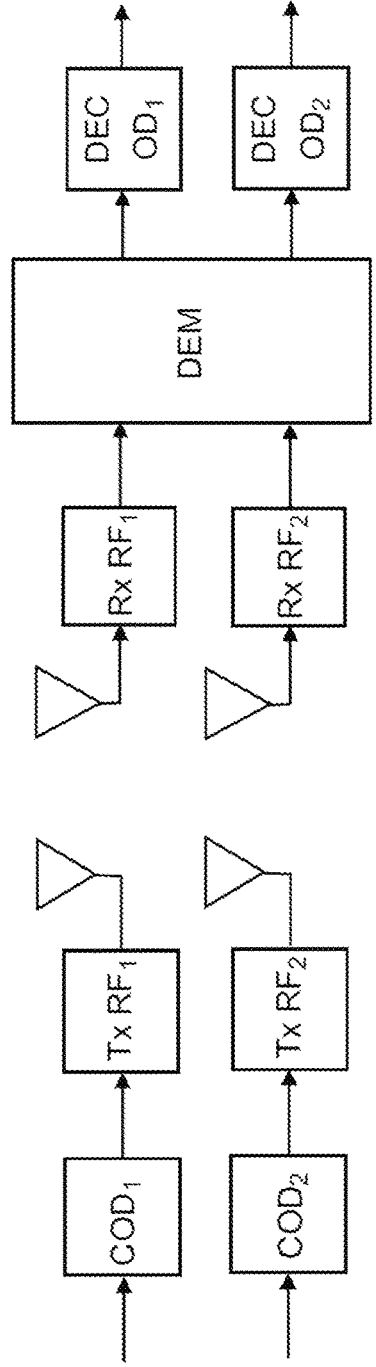
FIG. 8 shows a second variant embodiment of a transmission system according to the invention using one correction code per reception path.

One variant embodiment of the invention consists in adding an error correction code in order to protect the transmitted data from transmission channel interference. FIGS. 7 and 8 schematically show two examples of a transmission system according to this variant embodiment.

FIG. 7 schematically shows one exemplary embodiment for which a channel encoder COD is applied at transmission to the binary data to be transmitted, which are then distributed on the various transmission paths by way of a series-to-parallel converter S/P. The modulation may be performed before or after the series-to-parallel conversion. At reception, a parallel-to-series converter is inserted at the output of the demodulator DEM so as to provide a sequence of binary symbols to a channel decoder DECOD.

The chosen correction code is for example an algebraic code, in particular a BCH code.

FIG. 8 schematically shows another exemplary embodiment for which a separate correction code is applied to each transmission path. One advantage of this variant is that the coding rate may be chosen independently for each path. For example, the coding rate may be adapted to the spatial interference level experienced by each receive antenna.

Figure 9:
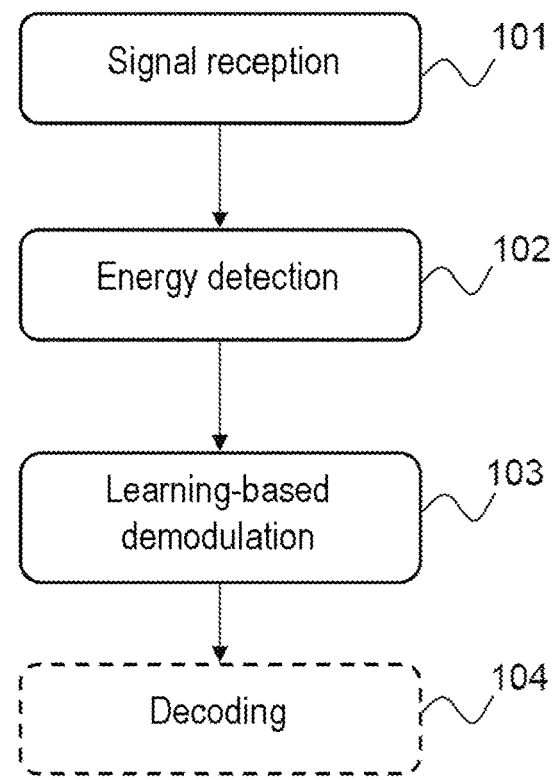
FIG. 9 shows a flowchart detailing the steps for implementing the reception method according to any one of the embodiments of the invention.

FIG. 9 shows a flowchart detailing the steps for implementing the signal reception method according to the invention.

The signals transmitted by a multipath transmitter are received by the multipath receiver in step 101. On each reception path, energy detection 102 is applied and then machine learning-based joint demodulation 103 is applied to the observations provided at one instant by each receive antenna. A decoding step 104 is optionally applied if a correction code was used at transmission.

Figure 10:
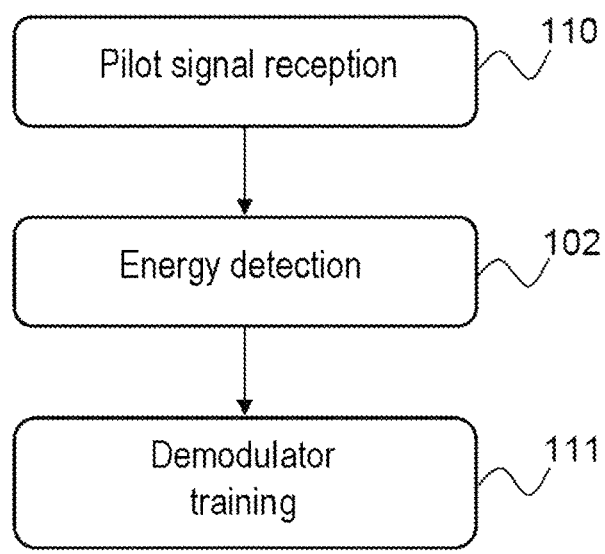
FIG. 10 shows a flowchart detailing a preliminary phase of training the demodulator.

The demodulation algorithm is optimized based on a preliminary learning phase shown in FIG. 10.

This learning phase consists in transmitting pilot signals 110 that are received by the multipath receiver. The energy detection 102 is applied in the same way to these signals received by each antenna of the receiver, and then a phase of training 111 the learning algorithm is carried out so as to optimize the parameters of the demodulator such that it learns to demodulate the symbols corresponding to each transmission path based on the received observations.

The invention has numerous advantages over demodulators based on a maximum likelihood algorithm.

First and foremost, the invention does not require a precise estimate of the propagation channel, since the neural network learns the characteristics of the channel during the learning phase by taking into consideration nonlinearities introduced by the energy detectors.

Moreover, other nonlinearities may be introduced by imperfections in the components forming the RF reception chains. An algorithm based on maximum likelihood does not take these nonlinearities into consideration.

REFERENCES

[1] G. K. Psaltopoulos and A. Wittneben, "Diversity and spatial multiplexing of MIMO amplitude detection receivers" in 2009 IEEE 20th International Symposium on Personal, Indoor and Mobile Radio Communications, September 2009, pp. 202-206.

[2] N. Farsad and A. Goldsmith, "Neural network detection of data sequences in communication systems", IEEE Transactions on Signal Processing, vol. 66, no. 21, pp. 5663-5678, 2018.

[3] A. Elrharras, R. Saadane, M. Wahbi, and A. Hamdoun, "Hybrid architecture for spectrum sensing algorithm based on energy detection technique and artificial neural networks" in 2014 5th Workshop on Codes, Cryptography and Communication Systems (WCCCS), 2014, pp. 40-44.

[4] N. Samuel, T. Diskin, A. Wiesel, "Deep MIMO Detection" in 2017 IEEE 18th International Workshop on signal processing advances in wireless communications.

The invention claimed is:

1. A method for receiving a plurality of separate signals transmitted respectively by a plurality of transmit antennas, the method comprising the steps of:

receiving a plurality of respective signals on a plurality of receive antennas, applying energy detection to each of the received signals, comprising quadratic detection and time integration, and jointly demodulating the received signals by way of a machine-learning algorithm trained beforehand so as to learn to demodulate each modulated symbol of the transmitted signal based on the respective contributions of this modulated symbol that are received on the plurality of receive antennas, wherein the machine-learning algorithm is implemented by way of at least one artificial neural network receiving the respective signals received on the receive antennas at input and providing an estimate of the transmitted symbols at output, and wherein a separate artificial neural network is implemented in order to demodulate each signal transmitted by a separate transmit antenna based on all of the respective signals received on the receive antennas.

2. The reception method according to claim 1, wherein the transmitted signals are amplitude-modulated.

3. The reception method according to claim 1, wherein at least one artificial neural network is implemented in order to jointly demodulate the signals transmitted by a plurality of transmit antennas.

4. The reception method according to claim 1, furthermore comprising a preliminary phase of training the machine-learning algorithm on pilot symbols transmitted by the plurality of transmit antennas.

5. The reception method according to claim 4, wherein the machine- learning algorithm is trained so as to minimize an error rate between the demodulated symbols and the transmitted symbols.

6. The reception method according to claim 1, wherein the transmitted signals are protected by way of an error correction code and the method furthermore comprises a step of decoding the demodulated symbols by way of a channel decoder applied to the demodulated symbols on the various series-concatenated reception paths.

7. The reception method according to claim 1, wherein the transmitted signals are protected by way of an error correction code and the method furthermore comprises a step of decoding the demodulated symbols on each reception path in parallel by way of a plurality of respective decoders.

8. The reception method according to claim 6, wherein the correction code is an algebraic code or a BCH code.

9. The reception method according to claim 1, wherein the transmitted signals are modulated with a pulse position modulation (PPM) or a pulse width modulation (PWM) or a pulse amplitude modulation (PAM) or an on-off keying amplitude modulation (OOK).

10. A multipath receiver, comprising:

a plurality of receive antennas for receiving separate signals transmitted respectively by a plurality of transmit antennas, one energy detector per reception path, comprising a quadratic detector and a time integrator, and a demodulator configured so as to jointly demodulate the received signals by way of a machine-learning algorithm trained beforehand so as to learn to demodulate a modulated symbol of the transmitted signal based on the respective contributions of this modulated symbol that are received on the plurality of receive antennas, wherein the machine-learning algorithm is implemented by way of at least one artificial neural network receiving the respective signals received on the receive antennas at input and providing an estimate of the transmitted symbols at output, and wherein a separate artificial neural network is implemented in order to demodulate each signal transmitted by a separate transmit antenna based on all of the respective signals received on the receive antennas.

11. The multipath receiver according to claim 10, furthermore comprising a number of receive antennas greater than or equal to the number of transmit antennas.

12. The multipath receiver according to claim 10, wherein the demodulator comprises a number of outputs equal to the number of transmit antennas.

13. The multipath receiver according to claim 10, furthermore comprising a demultiplexer for series-concatenating the demodulated symbols on the various outputs of the demodulator and a channel decoder configured so as to decode the symbols at the output of the demultiplexer.

14. The multipath receiver according to claim 10, furthermore comprising a separate channel decoder configured so as to decode the symbols provided on each respective output of the demodulator.

15. The multipath receiver according to claim 14, wherein the coding rate of each channel decoder is configured independently.

* * * * *